US012007488B2

(12) United States Patent
Xu (10) Patent No.: US 12,007,488 B2
(45) Date of Patent: Jun. 11, 2024

(54) POWER MANAGEMENT METHOD FOR PORTABLE COMMUNICATION DEVICE

(71) Applicant: MICRON ELECTRONICS LLC, Boca Raton, FL (US)

(72) Inventor: Jun Xu, Boca Raton, FL (US)

(73) Assignee: MICRON ELECTRONICS LLC, Boca Raton, FL (US)

( * ) Notice: Subject to any disclaimer, the term of this patent is extended or adjusted under 35 U.S.C. 154(b) by 370 days.

(21) Appl. No.: 17/546,651

(22) Filed: Dec. 9, 2021

(65) Prior Publication Data

US 2022/0179099 A1 Jun. 9, 2022

Related U.S. Application Data

(60) Provisional application No. 63/123,088, filed on Dec. 9, 2020.

(51) Int. Cl.
*G01S 19/34* (2010.01)
*G01S 5/00* (2006.01)
*G01S 19/24* (2010.01)

(52) U.S. Cl.
CPC .......... *G01S 19/34* (2013.01); *G01S 5/0027* (2013.01); *G01S 19/243* (2013.01)

(58) Field of Classification Search
CPC ....... G01S 19/34; G01S 19/243; G01S 5/0027

USPC ................................................ 342/357.74
See application file for complete search history.

(56) References Cited

U.S. PATENT DOCUMENTS

| 2015/0123847 A1* | 5/2015 | Farmer | G01S 19/34 |
| | | | 342/357.74 |
| 2017/0331333 A1* | 11/2017 | Clark | H02J 50/10 |
| 2022/0179099 A1* | 6/2022 | Xu | G01S 19/17 |

\* cited by examiner

*Primary Examiner* — Harry K Liu
(74) *Attorney, Agent, or Firm* — ANOVA LAW GROUP, PLLC (57) ABSTRACT

A power management method for a portable device including a global navigation satellite system (GNSS) receiver and a wireless transceiver includes: in a normal mode, sending at a first interval first location information obtained from the wireless transceiver to a central station in an emergency response system via the wireless transceiver, where the GNSS receiver is placed in a lower mode or a power-off mode; in an emergency mode, sending in a predefined sequence and priority the first location information obtained from the wireless transceiver and second location information obtained from the GNSS receiver to the central station via the wireless transceiver, wherein the GNSS receiver is placed in a full power mode; and in response to failing to obtain the first location information from the wireless transceiver at the first interval, entering the emergency mode and skipping sending the first location information to the central station.

20 Claims, 4 Drawing Sheets

POWER MANAGEMENT METHOD FOR PORTABLE COMMUNICATION DEVICE

CROSS-REFERENCE TO RELATED APPLICATION

This application claims the priority of U.S. Provisional Patent Application No. 63/123,088, filed on Dec. 9, 2020, the entire content of which is incorporated herein by reference.

FIELD OF THE INVENTION

The present invention generally relates to wireless communication technologies and, more particularly, to a power management method for a portable device, a portable device, and a central station.

BACKGROUND

An emergency response system often at least includes a portable device and a central station configured to monitor the portable device. In most applications, the portable device periodically reports location information thereof to the central station. The portable device often obtains the location information via an onboard global navigation satellite system (GNSS) receiver. The GNSS receiver operates in a full power mode, a low power mode, and a power-off mode. Only when operated in the full power mode, the GNSS receiver is able to obtain the location information. The GNSS receiver consumes more power in the full power mode than in the low power mode or the power-off mode. To reduce the power consumption of the portable device, it is desirable to place the GNSS receiver in the low power mode or the power-off mode when the portable device is in a normal mode (i.e., a non-emergency mode), and to place the GNSS receiver in the full power mode when the portable device is in an emergency mode.

BRIEF SUMMARY OF THE DISCLOSURE

One aspect of the present disclosure provides a power management method for a portable device including a global navigation satellite system (GNSS) receiver and a wireless transceiver. The method includes: in a normal mode, sending at a first interval, by the portable device, first location information obtained from the wireless transceiver to a central station in an emergency response system via the wireless transceiver, wherein the GNSS receiver is placed in a lower mode or a power-off mode; in an emergency mode, sending in a predefined sequence and priority, by the portable device, the first location information obtained from the wireless transceiver and second location information obtained from the GNSS receiver to the central station via the wireless transceiver, wherein the GNSS receiver is placed in a full power mode; and in response to failing to obtain the first location information from the wireless transceiver at the first interval, entering the emergency mode and skipping sending the first location information to the central station by the portable device. The GNSS receiver consumes more power in the full power mode than in the low power mode or the power-off mode, and each of the first location information and the second location information includes a user ID and account information of the portable device.

Another aspect of the present disclosure provides a portable device in an emergency response system at least including the portable device and a central station. The portable device includes: a global navigation satellite system (GNSS) receiver configured to obtain first location information; a wireless transceiver configured to obtain second location information and to communicate with the central station; a memory storing program instructions; and a processor configured to execute the program instructions to perform: in a normal mode, sending at a first interval the first location information obtained from the wireless transceiver to the central station via the wireless transceiver, wherein the GNSS receiver is placed in a low power mode or a power-off mode; in an emergency mode, sending in a predefined sequence and priority the first location information obtained from the wireless transceiver and the second location information obtained from the GNSS receiver to the central station via the wireless transceiver, wherein the GNSS receiver is placed in a full power mode; and in response to failing to obtain the first location information from the wireless transceiver, entering the emergency mode and skipping sending the first location information to the central station. The GNSS receiver consumes more power in the full power mode than in the low power mode or the power-off mode, and each of the first location information and the second location information includes a user ID and account information of the portable device.

Another aspect of the present disclosure provides a central station in an emergency response system at least including a portable device and the central station. The central station includes: a memory storing program instructions; and a processor configured to execute the program instructions to perform: receiving first location information sent from the portable device at a first interval; in response to missing the first location information sent from the portable device at the first interval for a number of times exceeding a first threshold, sending a first command to the portable device to force the portable device to enter an emergency mode, wherein the first location information is obtained from a wireless transceiver of the portable device; and in response to receiving again the first location information sent from the portable device at the first interval for a number of times exceeding a second threshold, sending a second command to the portable device to force the portable device to exit the emergency mode and enter a normal mode. The first threshold and the second threshold are a positive integer.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
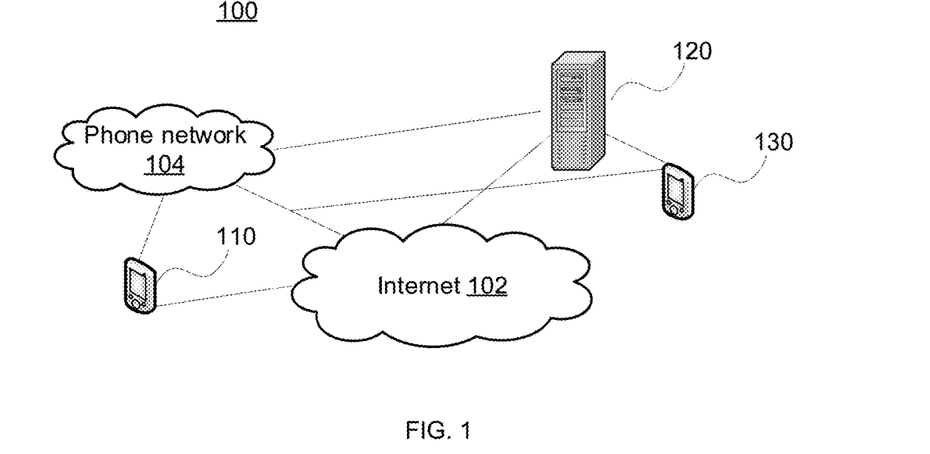
FIG. 1 illustrates an exemplary emergency communication environment incorporating certain aspects of the disclosed embodiments.

FIG. 1 illustrates an exemplary emergency communication environment incorporating certain aspects of the disclosed embodiments. As shown in FIG. 1, communication environment 100 may include the Internet 102, a phone network 104, a portable device 110, a central station 120, and a communication device 130. Other components may be added and certain components may be removed without departing from the principles of the disclosed embodiments.

The Internet 102 may include any private and public computer networks interconnected using the standard transport control protocol/internet protocol (TCP/IP). Internet 102 may carry a large number of services over IP, such as the inter-linked hypertext documents of the World Wide Web (WWW) and electronic mail (or email). Internet 102 may connect a large number of websites. Further, Internet 102 may also carry voice-over IP (VOIP) services to enable voice or the like communications over Internet 102.

The phone network 104 may include any appropriate phone network such as a VOIP network, a public switched telephone network (PSTN), a cellular network, or any other telephone networks.

The portable device 110 may include any appropriate communication transceiver wirelessly communicating with the central station 120. For example, the portable device 110 includes an Internet of Things (IoT) device, a GNSS navigation device, a mobile phone, a wearable device, an unmanned aerial vehicle, an emergency response vehicle, or a combination thereof. Although one portable device 110 is shown in FIG. 1, any number and types of portable devices may be included.

The central station 120 includes a call center, a cloud server, a backend platform, or a combination thereof. The central station 120 may include one or more appropriate computer servers configured to provide various services to users through the Internet 102 and/or the phone network 104. For example, the central station 120 may provide monitoring services (e.g., emergency monitoring, security monitoring, other types of monitoring, etc.), emergency response services, and/or emergency information access services, etc. Although one central station 120 is included, any number of central stations may be included.

The communication device 130 may include any appropriate device for communicating with the portable device 110 directly through wireless channels. The communication device 130 may also communicate with the central station 120. Under certain circumstances, the communication device 130 and the central station 120 may be used interchangeably.

The portable device 110 may communicate with the central station 120 wirelessly over various networks. For example, the portable device 110 may use any available wireless standards, such as, GSM, GPRS, CDMA, WCDMA, 3G, 4G, LTE, and 5G, etc., 2-way radio, point-to-point, satellite, Wi-Fi, Bluetooth, Bluetooth low energy, and any other appropriate wireless communication protocols to communicate with the central station 120. The portable device 110 may obtain location information from the wireless transceiver of the portable device 110 according to the above-described wireless communication protocols.

Further, the portable device 110 may communicate with the central station 120 through a wireless service operator or without a wireless service operator. For example, the portable device 110 may communicate with the central station 120 using a wireless operator's short message service (SMS) to exchange information with the central station 120.

In a normal operation or a regular operation, the central station 120 may maintain a database to store various information about associated portable devices 110. The portable device 110 may periodically report a device status, such as location information and/or a battery status of the portable device 110, to the central station 120 according to pre-configured criteria. Further, the central station 120 may configure the portable device 110 remotely.

For example, the central station 120 may set a status reporting period, or may set an emergency monitoring server (e.g., a phone number, an IP address, a SIP number, an IMS URI, etc.) or an intended reporting entity for the portable device 110 to communicate with. When an emergency event or another intended condition happens, the portable device 110 may communicate with the emergency monitoring server or the intended reporting entity automatically. The emergency monitoring server may include the central station 120 or a different entity, e.g., a 911 call center, etc. The intended reporting entity may include any appropriate devices or systems, such as a monitoring center, or a single user device (e.g., the communication device 130).

The communication environment 100 may be applied at various wireless communication systems and applications. For example, the communication environment 100 may include emergency wireless communication, asset tracking and monitoring, logistic, fleet management, and remote control, etc.

Figure 2:
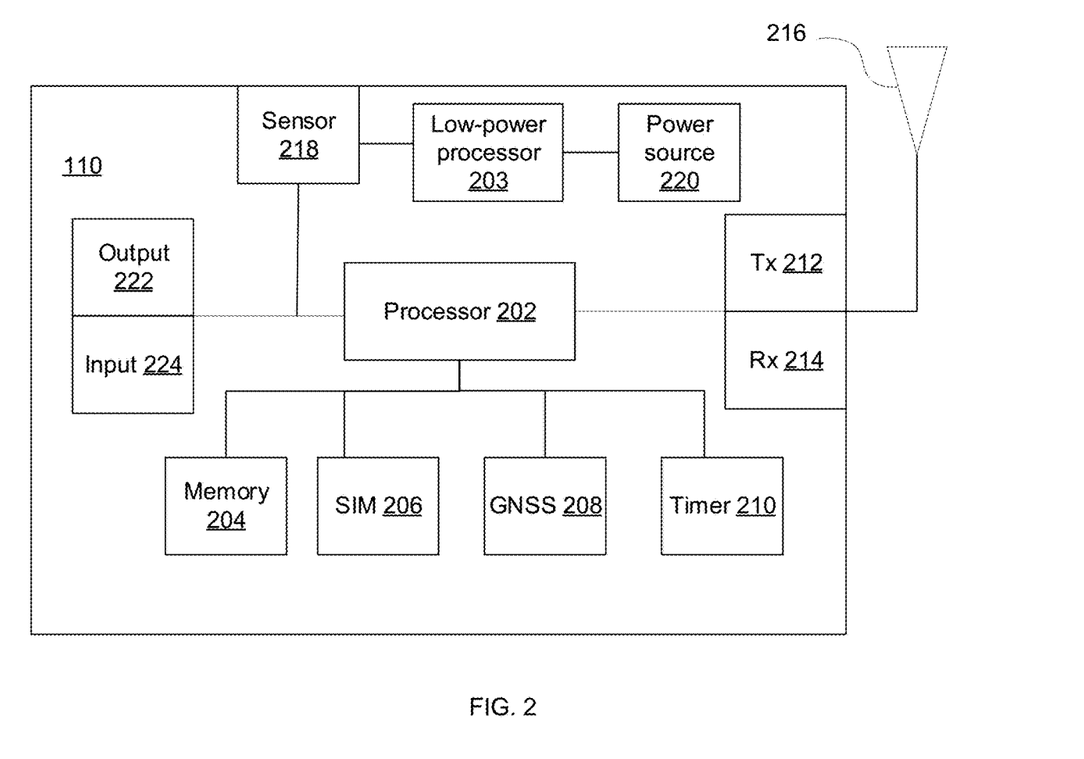
FIG. 2 illustrates a block diagram of an exemplary portable device consistent with the disclosed embodiments.

FIG. 2 illustrates a block diagram of an exemplary portable device 110 consistent with the disclosed embodiments. As shown in FIG. 2, the portable device 110 may include a processor 202, a low-power processor 203, a memory 204, a subscriber identification module (SIM) 206, a global navigation satellite system (GNSS) receiver 208, a timer 210, a transmitter 212, a receiver 214, an antenna 216, a sensor 218, a power source 220, an output 222, and an input 224. The transmitter 212, the receiver 214, and the antenna 216 are combined to form a wireless transceiver. The wireless transceiver includes at least one of a Wi-Fi transceiver, a Bluetooth transceiver, or a cellular radio frequency (RF) transceiver. Certain components may be omitted, and other components may be added.

The processor 202 may include any appropriate type of graphic processing unit (GPU), general-purpose microprocessor, digital signal processor (DSP) or microcontroller, and application specific integrated circuit (ASIC), etc. The processor 202 may also include a communication processor, such as a base-band processor for wireless communication, etc.

The processor 202 may execute sequences of computer program instructions to perform various processes associated with the portable device 110. The computer program instructions may be stored and/or loaded in the memory 204 for execution by the processor 202.

The low-power processor 203 may include its own memory and interfaces to connect to the sensor 218. The low-power processor 203 may monitor a sensing signal from the sensor 218 and determine whether the sensing signal triggers a wake-up event. In response to the wake-up event, the low-power processor 203 may connect the power source 220 to a first circuit of the portable device 110. The first circuit may include at least the processor 202 and the memory 204 to perform the normal operation of the portable device 110. The first circuit may further include other components of the portable device 110 that are required for performing the normal operation of the portable device 110.

In certain embodiments, the first circuit may also include one or more of the SIM 206, the GNSS receiver 208, the timer 210, the transmitter 212, the receiver 214, the antenna 216, the output 222, and the input 224. In certain embodiments, the processor 202 may have the lower-power processor 203 built in.

In certain embodiments, the low-power processor 203 may further include one or more of its own sensor, timer, and low-power machine-to-machine (M2M) communication mechanism for detecting the wake-up event. The circuit for detecting the wake-up event and connecting the power source to the first circuit after the wake-up event is detected is called a second circuit. The second circuit may include at least the low-power processor 203. The second circuit does not perform the normal operation of the portable device 110. The second circuit manages connection of the power source 220 to the first circuit. The second circuit is always connected to the power source 220, but consumes substantially less power than the first circuit.

The memory 204 may include any appropriate memory units, such as random-access memory (RAM), read-only memory (ROM), flash memory, or any other type of memory or storage. The memory 204 may include a non-volatile memory (e.g., flash memory) for storing data as well as program execution states to preserve such information when power is not available. The non-volatile and other volatile memory may also be used for executing computer programs and storing run-time data, etc.

The SIM 206 may include any appropriate subscriber identification card to authenticate the portable device 110 and for accessing a wireless network corresponding to the SIM 206. Although the SIM 206 is used in FIG. 2, any type of identification device may be used.

The GNSS receiver 208 may include at least one of a global positioning system (GPS) receiver, a global orbiting navigation satellite system (GLONASS) receiver, a BeiDou navigation satellite system (BDS) receiver, or a Galileo receiver for providing location information about the portable device 110. The timer 210 may provide various timer functions and associated logics for the portable device 110.

Further, through the antenna 216, the transmitter 212 and the receiver 214 may provide wireless voice and data communication transmission and receiving functions according to various wireless communication protocols. The sensor 218 may include any appropriate type of sensors for sensing one or more parameters such that a sensing signal may be provided to the processor 202 for further processing to determine the sensing parameters, or the sensing signal may be used directly to control certain logics of the portable device 110.

The power source 220 may include any appropriate power source to provide an electrical power to the first circuit and the second circuit, such as the processor 202, the low-power processor 203, and other components of the portable device 110. For example, the power source 220 may include AC power, DC power, solar power, and/or other power. In certain embodiments, the power source 220 may include one or more batteries, and the one or more batteries may be recharged using various types of external power sources. Further, the power source 220 may also include certain control logics for sending battery status to report to the processor 202 and/or to controlling/distributing battery output to the various components. A power-on switch (not shown) may be used to control the power to the various components of the portable device 110, such as the processor 202, the SIM 206, the transmitter 212, and the receiver 214, etc.

The output 222 may be provided for a user of the portable device 110 to receive information from the portable device 110. For example, the output 222 may include any appropriate output device, such as a display, a speaker, or any other output devices.

The input 224 may be provided for the user of the portable device 110 to input information into the portable device 110. For example, the input 224 may include any appropriate input device, such as a keyboard, a microphone, a touch screen, or any other input devices. In certain embodiments, the input 224 may be a single button, which can be pressed by the user such that a communication message can be sent to a pre-configured emergency monitoring server or a pre-configured intended reporting entity. For example, the input 224 is an SOS button. After the SOS button is pressed by the user, a distress signal is sent immediately from the portable device 110 to the central station 120.

Figure 3:
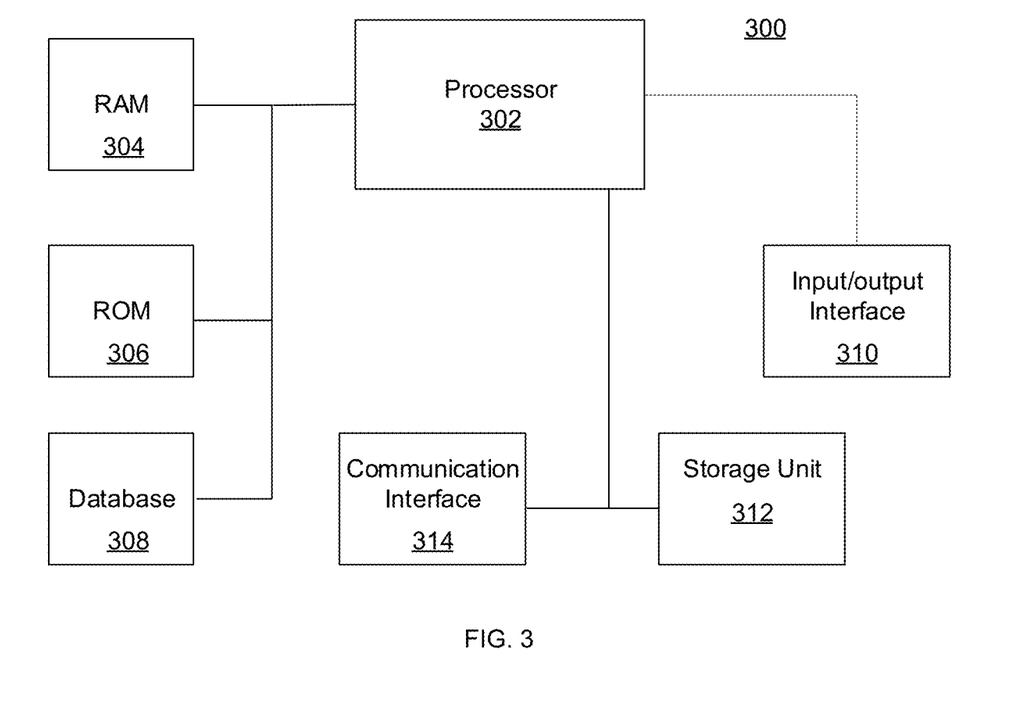
FIG. 3 illustrates a block diagram of an exemplary central station consistent with the disclosed embodiments.

On the other hand, the central station 120 may be implemented by any appropriate computer system. FIG. 3 illustrates a block diagram of an exemplary computing system 300 used to implement the central station 120.

As shown in FIG. 3, the computing system 300 may include a processor 302, a random-access memory (RAM) unit 304, a read-only memory (ROM) unit 306, a database 308, an input/output interface unit 310, a storage unit 312, and a communication interface 314. Other components may be added and certain devices may be removed without departing from the principles of the disclosed embodiments.

The processor 302 may include any appropriate type of graphic processing unit (GPU), general-purpose microprocessor, digital signal processor (DSP) or microcontroller, and application specific integrated circuit (ASIC), etc. The processor 302 may execute sequences of computer program instructions to perform various processes associated with the computing system 300. The computer program instructions may be loaded into the RAM 304 for execution by the processor 302 from the ROM 306.

The database 308 may include any appropriate commercial or customized database to be used by the computing system 300, and may also include query tools and other management software for managing the database 308. Further, the input/output interface 310 may be provided for a user or users to input information into the computing system 300 or for the user or users to receive information from the computing system 300. For example, the input/output interface 310 may include any appropriate input device, such as a remote control, a keyboard, a mouse, a microphone, a video camera or web-cam, an electronic tablet, voice communication devices, or any other optical or wireless input devices. The input/output interface 310 may also include any appropriate output device, such as a display, a speaker, or any other output devices.

The storage unit 312 may include any appropriate storage device to store information used by the computing system 300, such as a hard disk, a flash disk, an optical disk, a CR-ROM drive, a DVD or other type of mass storage media, or a network storage. Further, the communication interface 314 may provide communication connections such that the computing system 300 may be accessed remotely and/or communicate with other systems through computer networks or other communication networks via various communication protocols, such as TCP/IP, hyper text transfer protocol (HTTP), etc.

Returning to FIG. 2, in a normal mode, the portable device 110 periodically sends the location information to the central station 120. The portable device 110 may obtain the location information through the wireless transceiver from adjacent devices, Wi-Fi routers, and/or cellular base stations. Because the portable device 110 includes the GNSS receiver 208, the portable device 110 may also obtain the location information from the GNSS receiver 208. The GNSS receiver 208 may operate in a full power mode (also known as active mode), a low power mode (also known as sleep mode), or a power-off mode (also known as power removed mode). In the full power mode, the GNSS receiver 208 is able to obtain the location information. In the low power mode, the GNSS receiver 208 is unable to obtain the location information, but is able to quickly switch to the full power mode. In the power-off mode, the GNSS receiver 208 is not connected to a power supply source, is unable to obtain the location information, and takes longer to switch to the full power mode.

The present disclosure provides a power management method to manage different modes of the GNSS receiver 208 of the portable device 110, such that power consumption of the portable deice 110 is reduced.

Figure 4:
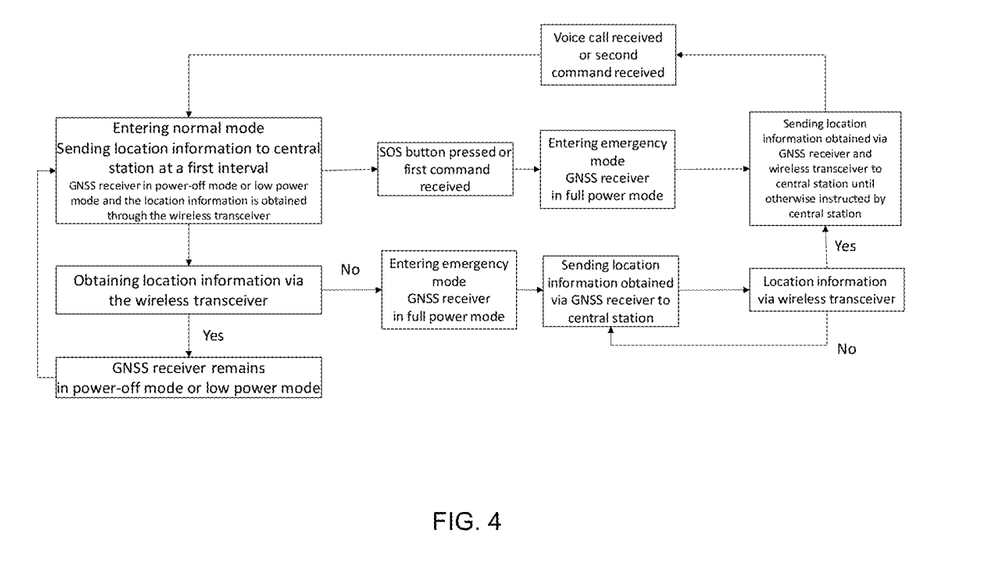
FIG. 4 illustrates an exemplary power management operation process consistent with the disclosed embodiments.

FIG. 4 illustrates an exemplary power management operation process consistent with the disclosed embodiments. In some embodiments, the emergency response system may be a mobile personal emergency response system (mPERS). The emergency response system at least includes an mPERS device and a monitoring center. The mPERS device is similar to the portable device 110 in FIG. 1. The mPERS device (i.e., the portable device 110) communicates with the monitoring center (i.e., the central station 120) through a cellular network such as 4G and 5G wireless networks.

The central station 120 may include one or more monitoring servers and a plurality of call center operators or emergency care givers. A user of the mPERS subscribes to an emergency service, such as a medical emergency service. In case of emergency, the user may press an SOS button of the portable device 110 to initiate reporting an emergency event. The portable device communicates with the mPERS base station which reports the emergency event to the central station 120. Generally, a voice phone call is established between the user and an emergency care giver.

In some embodiments, an emergency monitoring service is provided to the user. mPERS allows the user to leave home and continue to have access to the emergency monitoring service. An emergency alert or a distress signal may be sent to the central station 120 directly or indirectly through an Internet of Things (IoT) cloud. The emergency care giver at the central station 120 may initiate a call-back phone call to the user after receiving the distress signal from the user.

As shown in FIG. 4, the portable device 110 operates in two modes, that is, the normal mode and the emergency mode. In the normal mode, the GNSS receiver 208 of the portable device 110 is placed in the low power mode or the power-off mode. The portable device 110 cannot obtain the location information from the GNSS 208 in the low power mode or the power-off mode. Instead, the portable device 110 obtains the location information from the wireless transceiver. The location information obtained from the GNSS receiver 208 may be more accurate than the location information obtained from the wireless transceiver. For illustration purpose, the location information obtained from the GNSS receiver 208 is referred to as first location information and the location information obtained from the wireless transceiver is referred to as second location information in the description below.

In the normal mode, the portable device 110 sends the first location information to the central station 120 at a first interval. At the first interval, the portable device 110 obtains the first location information from the wireless transceiver and sends the first location information to the central station 120. However, the portable device 110 may fail to obtain the first location information from the wireless transceiver for various reasons. In this case, the portable device 110 skips sending the first location information to the central station 120. Correspondingly, the central station 120 won't receive the first location information from the portable device 110 at the expected first interval. After the central station 120 misses receiving the first location information from the portable device 110 for a number times exceeding a first threshold, the central station 120 send a first command to the portable device 110. The first threshold is a positive integer. Correspondingly, the portable device 110 receives the first command, exits the normal mode, and enters the emergency mode.

In the emergency mode, the portable device 110 places the GNSS receiver 208 in the full power mode, obtains the second location information from the GNSS receiver 208 in the full power mode, and sends the second location information to the central station 120 at a second interval. At the same time, the portable device 110 attempts to obtain the first location information from the wireless transceiver at the first interval. When the attempt to obtain the first location information from the wireless transceiver fails, the portable device 110 skips sending the first location information to the central station 120 at the expected first interval. When the attempt to obtain the first location information from the wireless transceiver succeeds, the portable device 110 sends the first location information to the central station 120 at the expected first interval. In some embodiments, the portable device 110 sends the first location information and the second location information to the central station in a predefined sequence and priority. For example, the first interval and the second interval are set to a same value, and the first location information and the second location information are combined to send to the central station 120.

Under certain circumstances, the messages exchanged between the portable device 110 and the central station 120 may be corrupted or lost. To address this scenario, the central station 120 resends the first command to the portable device 110 in response to missing the second location information sent from the portable device at the second interval. The central station 120 resends the first command to the portable device 110 until a number of times of resending the first command exceeds a third threshold. The third threshold is a positive integer. After the number of times of resending the first command exceeds the third threshold, the central station 120 alerts an operator of the central station to take remedy action.

In the emergency mode, the portable device 110 periodically attempts to obtain the first location information from the wireless transceiver at the first interval. After the portable device 110 is able to obtain the first location information again from the wireless transceiver, the portable device 110 resumes sending the first location information to the central station 120 at the first interval. Correspondingly, the central station 120 receives the first location information again at the first interval. In response to receiving again the first location information sent from the portable device at the first interval for a number of times exceeding a second threshold, the central station 120 sends a second command to the portable device 110. After the portable device 110 receives the second command, the portable device 110 exits the emergency mode and returns to the normal mode.

In some embodiments, the portable device 110 is triggered to enter the emergency mode after the SOS button is pressed by the user. After the SOS button is detected to be pressed, the portable device 110 immediately places the GNSS receiver 208 in the full power mode, obtains the second location information from the GNSS receiver 208, sends the second location information to the central station at the second interval, and sends the distress signal to the central station 120. The portable device 110 continues to obtain the first location information from the wireless transceiver and sends the first location information to the central station 120 at the first interval. After the central station 120 receives the distress signal from the portable device 110, the central station 120 initiates a voice call to the portable device 110. Correspondingly, the portable device 110 receives the voice call from the central station 120. After the portable device 110 answers the voice call, the portable device places the GNSS receiver 208 in the low power mode or the power-off mode, exits the emergency mode, and returns to the normal mode.

In some embodiments, each of the first location information and the second location information includes a user ID and account information of the portable device 110. The central station 120 tracks the portable device 110 based on the user ID and the account information of the portable device 110.

In the embodiments of the present disclosure, the GNSS receiver consumes more power in the full power mode than in the low power mode or the power-off mode. By managing the modes of the GNSS receiver in the normal mode and the emergency mode of the portable device, the overall power consumption of the portable device is reduced.

Figure 5:
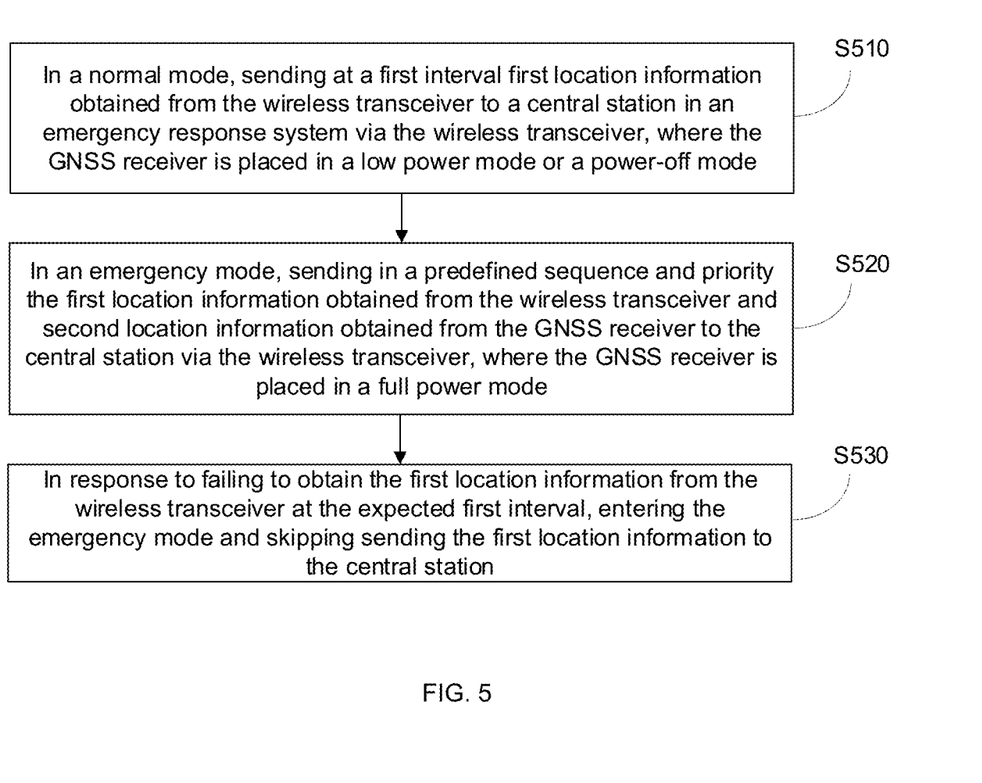
FIG. 5 illustrates an exemplary power management method for a portable device consistent with the disclosed embodiments.

FIG. 5 illustrates an exemplary power management method for a portable device consistent with the disclosed embodiments. The method is applied to an emergency response system at least including a portable device and a central station. The portable device at least includes a GNSS receiver and a wireless transceiver, operates in a normal mode or an emergency mode, and obtains first location information for the wireless transceiver and second location information from the GNSS receiver. The second location information may be more accurate than the first location information. The GNSS receiver operates in a full power mode, a low power mode, or a power-off mode. As shown in FIG. 5, the method includes the following processes.

At S510, in the normal mode, first location information obtained from the wireless transceiver is sent at a first interval to the central station in the emergency response system via the wireless transceiver, where the GNSS receiver is placed in the low power mode or the power-off mode.

In some embodiments, in the normal mode of the portable device, the portable device obtains the first location information from the wireless transceiver at the first interval and sends the first location information to the central station. Because the GNSS receiver is placed in the low power mode or the power-off mode, the power consumption of the portable device in the normal mode is low.

At S520, in the emergency mode of the portable device, the first location information obtained from the wireless transceiver and second location information obtained from the GNSS receiver are sent in a predefined sequence and priority to the central station via the wireless transceiver, where the GNSS receiver is placed in the full power mode.

In some embodiments, in the emergency mode of the portable device, the portable device obtains the first location information from the wireless transceiver and the second location information from the GNSS receiver. The portable device sends the first location information to the central station at a first interval, and sends the second location information to the central station at a second interval. In some embodiments, the first interval is greater than the second interval. In some other embodiments, the first interval is equal to the second interval.

At S530, in response to failing to obtain the first location information from the wireless transceiver at the expected first interval, the portable device enters the emergency mode and skips sending the first location information to the central station.

Under certain circumstances, the portable device switches between the normal mode and the emergency mode.

In some embodiments, the portable device switches from the normal mode to the emergency mode after the portable device fails to obtain the first location information from the wireless transceiver. In the emergency mode, the portable device sends the first location information to the central station when the portable device successfully obtains the first location information from the wireless transceiver at the expected first interval, and skips sending the first location information to the central station when the portable device fails to obtain the first location information from the wireless transceiver at the expected first interval. Similarly, in the emergency mode, the portable device sends the second location information to the central station when the portable device successfully obtains the second location information from the GNSS receiver at the expected second interval, and skips sending the second location information to the central station when the portable device fails to obtain the second location information from the GNSS receiver at the expected second interval.

In some embodiments, after the central station fails to receive the first location information at the expected first interval consecutively for a number of times exceeding a first threshold, the central station sends a first command to the portable device to switch the portable device from the normal mode to the emergency mode. The first threshold is a positive integer.

In some embodiments, after the central station successfully receives the first location information again at the expected first interval consecutively for a number of times exceeding a second threshold, the central station sends a second command to the portable device to switch the portable device from the emergency mode to the normal mode. The second threshold is a positive integer.

In some embodiments, the first threshold is equal to the second threshold.

In the embodiments of the present disclosure, the portable device reduces the power consumption by placing the GNSS receiver in the low power mode or the power-off mode during normal operation. The portable device turns on the GNSS receiver in the full power mode only during emergency. Thus, the portable device operates longer between charges.

Figure 6:
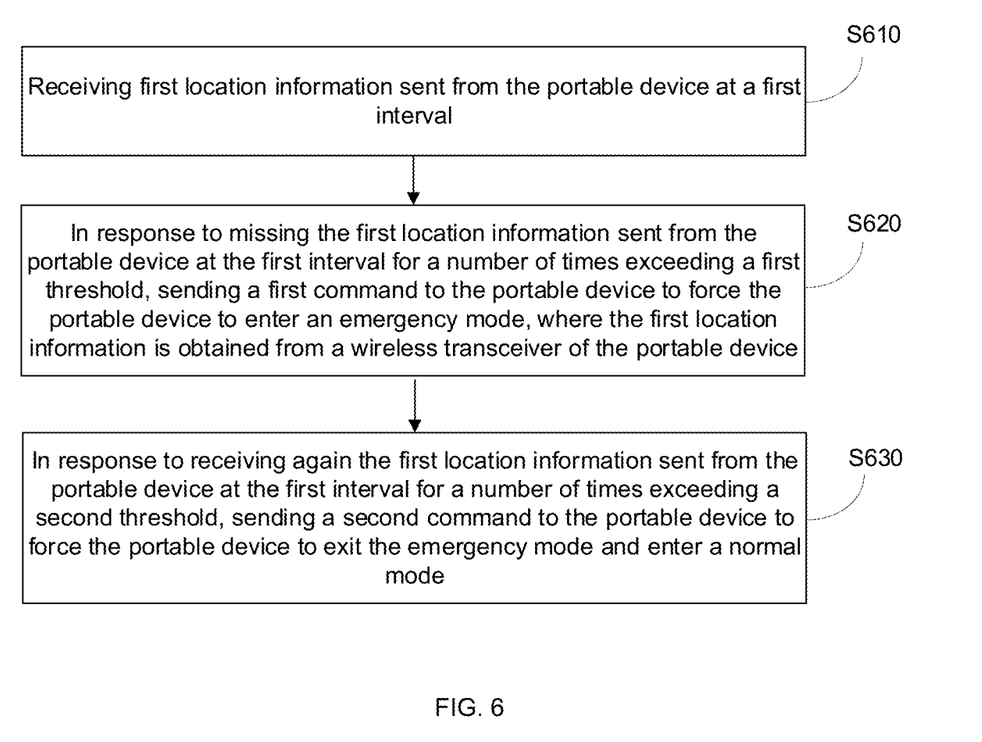
FIG. 6 illustrates an exemplary power management method for a central station consistent with the disclosed embodiments.

FIG. 6 illustrates an exemplary power management method for a central station consistent with the disclosed embodiments. The method is applied to an emergency response system at least including the portable device and the central station. The portable device at least includes a GNSS receiver and a wireless transceiver, operates in a normal mode or an emergency mode, and obtains first location information for the wireless transceiver and second location information from the GNSS receiver. The second location information may be more accurate than the first location information. The GNSS receiver operates in a full power mode, a low power mode, or a power-off mode. As shown in FIG. 6, the method includes the following processes.

At S610, the first location information sent from the portable device is received at a first interval.

In some embodiments, the central station receives the first location information sent from the portable device at the first interval. The first location information includes a user ID and account information of the portable device. The central station is able to track status of multiple portable devices based on the user ID and the account information.

At S620, in response to missing the first location information sent from the portable device at the first interval for a number of times exceeding a first threshold, the central station sends a first command to the portable device to force the portable device to enter an emergency mode.

In some embodiments, the central station counts how many times the central station misses receiving the first location information sent from the portable device. After the number of times the central station fails to receive the first location information exceeds the first threshold, the central station sends the first command to the portable device. After the portable device receives the first command, the portable device enters the emergency mode. The first threshold is a positive integer. The description about the operation of the portable device can be referred to the description about FIG. 5, and is omitted herein.

At S630, in response to receiving again the first location information sent from the portable device at the first interval for a number of times exceeding a second threshold, the central station sends a second command to the portable device to force the portable device to exit the emergency mode and enter the normal mode.

In some embodiments, the central station continues to monitor the portable device. After the central station receives again the first location information at the first interval for a number of times exceeding the second threshold, the central station sends the second command to the portable device to switch the portable device from the emergency mode to the normal mode, thereby reducing the power consumption of the portable device. The second threshold is a positive integer.

In some embodiments, the first threshold is equal to the second threshold.

In the embodiments of the present disclosure, the portable device reduces the power consumption by placing the GNSS receiver in the low power mode or the power-off mode during normal operation. The portable device turns on the GNSS receiver in the full power mode only during emergency. Thus, the portable device operates longer between charges.

The present disclosure also provides a portable device in an emergency response system at least including the portable device and a central station. The portable device includes: a global navigation satellite system (GNSS) receiver configured to obtain first location information; a wireless transceiver configured to obtain second location information and to communicate with the central station; a memory storing program instructions; and a processor configured to execute the program instructions to perform: in a normal mode, sending at a first interval the first location information obtained from the wireless transceiver to the central station via the wireless transceiver, where the GNSS receiver is placed in a low power mode or a power-off mode; in an emergency mode, sending in a predefined sequence and priority the first location information obtained from the wireless transceiver and the second location information obtained from the GNSS receiver to the central station via the wireless transceiver, where the GNSS receiver is placed in a full power mode; and in response to failing to obtain the first location information from the wireless transceiver, entering the emergency mode and skipping sending the first location information to the central station. The GNSS receiver consumes more power in the full power mode than in the low power mode or the power-off mode, and each of the first location information and the second location information includes a user ID and account information of the portable device.

In some embodiments, the portable device further includes an SOS button. The processor is further configured to perform: in response to the SOS button being pressed by a user, entering the emergency mode and sending a distress signal to the central station via the wireless transceiver, wherein the distress signal includes the second location information, the user ID, and the account information of the portable device; and after receiving and answering a voice call from the central station, exiting the emergency mode and entering the normal mode.

In some embodiments, the processor is further configured to perform: in response to receiving a first command sent from the central station, entering the emergency mode; and in response to receiving a second command sent from the central station, exiting the emergency mode and entering the normal mode by the portable device.

In some embodiments, the GNSS receiver includes at least one of a global positioning system (GPS) receiver, a global orbiting navigation satellite system (GLONASS) receiver, a BeiDou navigation satellite system (BDS) receiver, or a Galileo receiver.

In some embodiments, the wireless transceiver includes at least one of a Wi-Fi transceiver, a Bluetooth transceiver, or a cellular radio frequency (RF) transceiver.

In some embodiments, the portable device communicates with the central station indirectly through a public wireless network.

In the embodiments of the present disclosure, the portable device reduces the power consumption by placing the GNSS receiver in the low power mode or the power-off mode during normal operation. The portable device turns on the GNSS receiver in the full power mode only during emergency. Thus, the portable device operates longer between charges.

The present disclosure also provides a central station in an emergency response system at least including a portable device and the central station. The central station includes: a memory storing program instructions and a processor configured to execute the program instructions to perform: receiving first location information sent from the portable device at a first interval; in response to missing the first location information sent from the portable device at the first interval for a number of times exceeding a first threshold, sending a first command to the portable device to force the portable device to enter an emergency mode, wherein the first location information is obtained from a wireless transceiver of the portable device; and in response to receiving again the first location information sent from the portable device at the first interval for a number of times exceeding a second threshold, sending a second command to the portable device to force the portable device to exit the emergency mode and enter a normal mode. The first threshold and the second threshold are a positive integer.

In some embodiments, the processor is further configured to perform: in response to receiving a distress signal sent from the portable device, initiating a voice call to the portable device.

In some embodiments, the processor is further configured to perform: in response to missing second location information sent from the portable device at a second interval, resending the first command to the portable device until a number of times of resending the first command exceeds a third threshold, wherein the second location information is obtained from a global navigation satellite system (GNSS) receiver of the portable device and the third threshold is a positive integer; and after the number of times of resending the first command exceeds the third threshold, alerting an operator of the central station to take remedy action.

In some embodiments, the GNSS receiver includes at least one of a global positioning system (GPS) receiver, a global orbiting navigation satellite system (GLONASS) receiver, a BeiDou navigation satellite system (BDS) receiver, or a Galileo receiver.

In the embodiments of the present disclosure, the portable device reduces the power consumption by placing the GNSS receiver in the low power mode or the power-off mode during normal operation. The portable device turns on the GNSS receiver in the full power mode only during emergency. Thus, the portable device operates longer between charges.

Those skilled in the art should understand that all or some of the processes in above-described the embodiments of the present disclosure may be implemented by instructing relevant hardware through a computer program. The computer program may be stored in a computer-readable storage medium. When being executed, the computer program includes the processes of the above-described method embodiments. The storage medium may be a magnetic disk, an optical disk, a read-only memory (ROM), or a random-access memory (RAM), etc.

In the specification, specific examples are used to explain the principles and implementations of the present disclosure. The description of the embodiments is intended to assist comprehension of the methods and core inventive ideas of the present disclosure. At the same time, those of ordinary skill in the art may change or modify the specific implementation and the scope of the application according to the embodiments of the present disclosure. Thus, the content of the specification should not be construed as limiting the present disclosure.

What is claimed is:

1. A power management method for a portable device including a global navigation satellite system (GNSS) receiver and a wireless transceiver, comprising:
    in a normal mode, sending at a first interval, by the portable device, first location information obtained from the wireless transceiver to a central station in an emergency response system via the wireless transceiver, wherein the GNSS receiver is placed in a lower mode or a power-off mode;
    in an emergency mode, sending in a predefined sequence and priority, by the portable device, the first location information obtained from the wireless transceiver and second location information obtained from the GNSS receiver to the central station via the wireless transceiver, wherein the GNSS receiver is placed in a full power mode; and
    in response to failing to obtain the first location information from the wireless transceiver at the first interval, entering the emergency mode and skipping sending the first location information to the central station by the portable device;
    wherein the GNSS receiver consumes more power in the full power mode than in the low power mode or the power-off mode, and each of the first location information and the second location information includes a user ID and account information of the portable device.

2. The method according to claim 1, wherein the portable device further includes an SOS button and the method further includes:
    in response to the SOS button being pressed by a user, entering the emergency mode and sending a distress signal to the central station via the wireless transceiver by the portable device, wherein the distress signal includes the second location information, the user ID, and the account information of the portable device; and
    after receiving and answering a voice call from the central station, exiting the emergency mode and entering the normal mode by the portable device.

3. The method according to claim 2, further including:
    in response to receiving the distress signal sent from the portable device, initiating, by the central station, the voice call to the portable device.

4. The method according to claim 1, further including:
    receiving, by the central station, the first location information sent from the portable device at the first interval;
    in response to missing the first location information sent from the portable device at the first interval for a number of times exceeding a first threshold, sending, by the central station, a first command to the portable device to force the portable device to enter the emergency mode; and
    in response to receiving again the first location information sent from the portable device at the first interval for a number of times exceeding a second threshold, sending, by the central station, a second command to the portable device to force the portable device to exit the emergency mode and enter the normal mode;
    wherein the first threshold and the second threshold are a positive integer.

5. The method according to claim 4, wherein sending the first command by the central station to the portable device includes:
    in response to missing the second location information sent from the portable device at a second interval, resending the first command by the central station to the portable device until a number of times of resending the first command exceeds a third threshold, wherein the third threshold is a positive integer; and
    after the number of times of resending the first command exceeds the third threshold, alerting, by the central station, an operator of the central station to take remedy action.

6. The method according to claim 4, further including:
    in response to receiving the first command sent from the central station, entering the emergency mode by the portable device; and
    in response to receiving the second command sent from the central station, exiting the emergency mode and entering the normal mode by the portable device.

7. The method according to claim 1, wherein:
    the GNSS receiver includes at least one of a global positioning system (GPS) receiver, a global orbiting navigation satellite system (GLONASS) receiver, a BeiDou navigation satellite system (BDS) receiver, or a Galileo receiver.

8. The method according to claim 1, wherein:
the wireless transceiver includes at least one of a Wi-Fi transceiver, a Bluetooth transceiver, or a cellular radio frequency (RF) transceiver.

9. The method according to claim 1, wherein:
the portable device communicates with the central station indirectly through a public wireless network.

10. The method according to claim 1, wherein:
the portable device includes an Internet of Things (IoT) device, a GNSS device, a mobile phone, a wearable device, an unmanned aerial vehicle, an emergency response vehicle, or a combination thereof; and
the central station includes a call center, a cloud server, a backend platform, or a combination thereof.

11. A portable device in an emergency response system at least including the portable device and a central station, comprising:
a global navigation satellite system (GNSS) receiver configured to obtain first location information;
a wireless transceiver configured to obtain second location information and to communicate with the central station;
a memory storing program instructions; and
a processor configured to execute the program instructions to perform:
in a normal mode, sending at a first interval the first location information obtained from the wireless transceiver to the central station via the wireless transceiver, wherein the GNSS receiver is placed in a low power mode or a power-off mode;
in an emergency mode, sending in a predefined sequence and priority the first location information obtained from the wireless transceiver and the second location information obtained from the GNSS receiver to the central station via the wireless transceiver, wherein the GNSS receiver is placed in a full power mode; and
in response to failing to obtain the first location information from the wireless transceiver, entering the emergency mode and skipping sending the first location information to the central station;
wherein the GNSS receiver consumes more power in the full power mode than in the low power mode or the power-off mode, and each of the first location information and the second location information includes a user ID and account information of the portable device.

12. The portable device according to claim 11, further including an SOS button, wherein the processor is further configured to perform:
in response to the SOS button being pressed by a user, entering the emergency mode and sending a distress signal to the central station via the wireless transceiver, wherein the distress signal includes the second location information, the user ID, and the account information of the portable device; and
after receiving and answering a voice call from the central station, exiting the emergency mode and entering the normal mode.

13. The portable device according to claim 11, wherein the processor is further configured to perform:
in response to receiving a first command sent from the central station, entering the emergency mode; and in response to receiving a second command sent from the central station, exiting the emergency mode and entering the normal mode by the portable device.

14. The portable device according to claim 11, wherein:
the GNSS receiver includes at least one of a global positioning system (GPS) receiver, a global orbiting navigation satellite system (GLONASS) receiver, a BeiDou navigation satellite system (BDS) receiver, or a Galileo receiver.

15. The portable device according to claim 11, wherein:
the wireless transceiver includes at least one of a Wi-Fi transceiver, a Bluetooth transceiver, or a cellular radio frequency (RF) transceiver.

16. The portable device according to claim 11, wherein:
the portable device communicates with the central station indirectly through a public wireless network.

17. A central station in an emergency response system at least including a portable device and the central station, comprising:
a memory storing program instructions; and
a processor configured to execute the program instructions to perform:
receiving first location information sent from the portable device at a first interval;
in response to missing the first location information sent from the portable device at the first interval for a number of times exceeding a first threshold, sending a first command to the portable device to force the portable device to enter an emergency mode, wherein the first location information is obtained from a wireless transceiver of the portable device; and
in response to receiving again the first location information sent from the portable device at the first interval for a number of times exceeding a second threshold, sending a second command to the portable device to force the portable device to exit the emergency mode and enter a normal mode;
wherein the first threshold and the second threshold are a positive integer.

18. The central station according to claim 17, wherein the processor is further configured to perform:
in response to receiving a distress signal sent from the portable device, initiating a voice call to the portable device.

19. The central station according to claim 17, wherein the processor is further configured to perform:
in response to missing second location information sent from the portable device at a second interval, resending the first command to the portable device until a number of times of resending the first command exceeds a third threshold, wherein the second location information is obtained from a global navigation satellite system (GNSS) receiver of the portable device and the third threshold is a positive integer; and
after the number of times of resending the first command exceeds the third threshold, alerting an operator of the central station to take remedy action.

20. The central station according to claim 19, wherein:
the GNSS receiver includes at least one of a global positioning system (GPS) receiver, a global orbiting navigation satellite system (GLONASS) receiver, a BeiDou navigation satellite system (BDS) receiver, or a Galileo receiver.

* * * * *